(12) United States Patent
Zalewski

(10) Patent No.: US 8,307,361 B2
(45) Date of Patent: Nov. 6, 2012

(54) PLATFORM DEPENDENT REPLACEMENT OF DIGITAL CONTENT ASSET COMPONENTS

(75) Inventor: Gary Zalewski, Oakland, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 1000 days.

(21) Appl. No.: 12/331,918

(22) Filed: Dec. 10, 2008

(65) Prior Publication Data

US 2010/0146502 A1    Jun. 10, 2010

(51) Int. Cl.
*G06F 9/445* (2006.01)

(52) U.S. Cl. .......................................... 718/1; 717/122

(58) Field of Classification Search .................. None
See application file for complete search history.

(56) References Cited

U.S. PATENT DOCUMENTS

| | | | |
|---|---|---|---|
| 6,121,998 A * | 9/2000 | Voois et al. ................ | 348/14.13 |
| 8,019,654 B2 * | 9/2011 | Alivandi ..................... | 705/26.1 |
| 2005/0130744 A1 * | 6/2005 | Eck et al. ........................ | 463/43 |
| 2007/0157173 A1 * | 7/2007 | Klein et al. .................... | 717/122 |
| 2007/0208953 A1 * | 9/2007 | Durand et al. ................ | 713/193 |
| 2008/0192936 A1 * | 8/2008 | Bellwood et al. ............. | 380/277 |

FOREIGN PATENT DOCUMENTS

WO    WO 2006-032613 A2 *   3/2006

* cited by examiner

*Primary Examiner* — Eric Coleman

(74) *Attorney, Agent, or Firm* — Lerner, David, Littenberg, Krumholz & Mentlik, LLP

(57) ABSTRACT

Systems and methods provide an operation of digital content assemblages such as video games with a digital processor so as to control platform dependent replacement of digital asset components. In a video game package operated on a first platform, the video game includes one or more first digital asset components such musical and/or graphical works. Platform association data is accessed to evaluate an association between the first digital asset component and the first platform. The platform association data is checked for a concurrence between the platform association data and platform data. A second digital asset component is substituted for the first digital asset component in accordance with the check of the platform association data to permit the operating of the digital content assemblage with the second digital asset component as a replacement for the first digital asset component.

22 Claims, 5 Drawing Sheets

PLATFORM DEPENDENT REPLACEMENT OF DIGITAL CONTENT ASSET COMPONENTS

FIELD OF THE TECHNOLOGY

The present technology relates to the operation of digital content packages. More specifically, it relates to methods and systems for implementing platform dependent replacement of asset components of composite digital content for different platforms.

BACKGROUND

Video games and video gaming systems are a popular form of entertainment. They can provide users with a rich virtual experience through the implementation of sound, visual and tactile interaction. As digital processing technology advances, game systems are further developed to provide an even more enhanced gaming experience. For example, the Playstation® line of gaming systems has several versions (Playstation®, Playstation® 2, Playstation® 3, Playstation Portable). There are hundreds of video games that can be played with these systems. The video games are typically distributed as a form software (e.g., with a data recording medium such as an optical disk or via a data transfer or download from a communications network). However, a video game may typically be initially designed to be played with one particular game system. As new systems are developed, backward compatibility of the system is desirable to permit older games to be played with newer systems. Since video games are often software, they are in a form that may readily permit utilization on newer systems. However, in addition to hardware issues, there can be many impediments to a seamless utilization of video game titles that were intended for older systems when they are applied to newer systems. It may be desirable to implement video games and/or video game systems with features to more readily promote cross-platform utilization.

BRIEF DESCRIPTION OF DRAWINGS

The present technology is illustrated by way of example, and not by way of limitation, in the figures of the accompanying drawings, in which like reference numerals refer to similar elements including.

SUMMARY OF THE TECHNOLOGY

Figure 1:
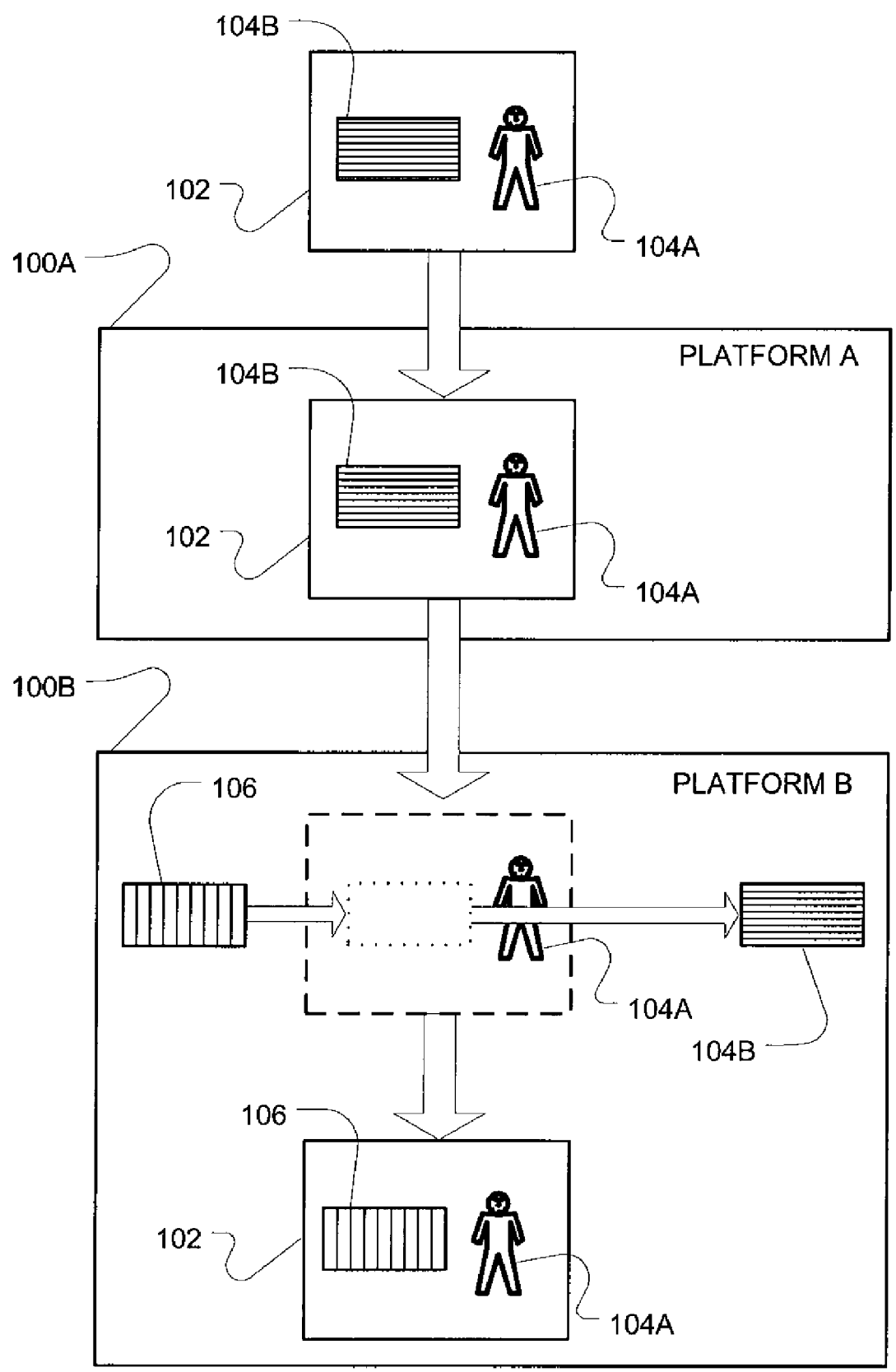
FIG. 1 is a conceptual diagram illustrating an example embodiment of a methodology for platform dependent replacement of digital content asset components of the present technology.

One aspect of the present technology involves platform dependent replacement of digital content asset components. In one embodiment, a digital content assemblage is operated with a digital processor to control platform dependent replacement of digital asset components. In the method, the digital content assemblage, including a first digital asset component, is operated with a first platform. Platform association data is accessed. The platform association data includes an association between the first digital asset component and a second platform. The platform association data is checked for a concurrence between the platform association data and the first platform. A second digital asset component is substituted for the first digital asset component in accordance with the checking to permit the operating of the digital content assemblage with the second digital asset component as a replacement for the first digital asset component.

In some embodiments, the technology may include a digital storage medium having stored digital processor control instructions. The digital processor control instructions form a method of operating a digital content assemblage with a digital processor to control platform dependent replacement of digital asset components. The medium may include processor control instructions to operate the digital content assemblage with a first platform. The digital content assemblage will include a first digital asset component. The medium may also have processor control instructions to access platform association data. The platform association data will include an association between the first digital asset component and a platform. The medium may also include processor control instructions to check the platform association data for a concurrence between the platform association data and the first platform. The medium may further include processor control instructions to substitute a second digital asset component for the first digital asset component in accordance with the checking to permit the operating of the digital content assemblage with the second digital asset component as a replacement for the first digital asset component.

In still further embodiments, a system controls a digital content assemblage with platform dependent replacement of digital asset components. Typically, the system may include a digital content assemblage for operation with a first platform. The digital content assemblage will have a first digital content asset. The system will also include platform association data to associate the first digital asset component and a platform. The system will also typically include a second digital asset component for substitution of the first digital asset component in accordance with a check of the first platform association data to permit operation of the digital content assemblage with the second digital asset component as a replacement for the first digital asset component when operating the digital content assemblage with the first platform.

In some embodiments, of the method, system or recording medium, the digital content assemblage can be digital entertainment software. The digital entertainment software may be a video game. Moreover, the first digital asset component may include a digital audio work, digital graphic work, and/or a digital video work. In still further embodiments, the operating the digital content assemblage with a first platform may include an emulator for or emulation of a second platform. In still further embodiments, the substituting may involve utilization of the second digital asset component upon confirmation that first characterization data associated with the first digital asset component and second characterization data associated with the second digital asset component correspond.

Further embodiments and features of the technology will be apparent from the following detailed disclosure, abstract, drawings and the claims.

DETAILED DESCRIPTION

An example embodiment of the platform dependent replacement of digital asset components of the present technology is illustrated in the diagram of FIG. 1. A digital content assemblage 102, such as an entertainment software package or video game, contains digital asset components 104A, 104B. The digital asset components are typically separable units or components of the aggregate software package but permit the user to obtain the full experience of the aggregate content of the game. Thus, when operated with the aggregate software package, the digital asset component can enhance the user's visual or audio experience with the aggregate software package. Thus, these digital asset components may be, for example, a video work, audio work or graphic work that are typically distributed with the aggregate software package. For example, the distributed video game software package may contain an audio work such as a music file or a voice file, such as a sound recording of a person for a character of a game. These files may be in an MP3 format or some other music or audio file format. A digital asset component may also be, for example, a video, such as an MPEG file or other format, etc., or a graphic image, such as a digital photograph in a JPEG file, etc. Typically, during operation with the aggregate software package such components may be triggered to play during particular portions of the operation so that sound and/or visual information can enhance the user's entertainment experience with the software package or video game.

A digital content assemblage 102 such as a video game may be operated with multiple platforms 100A, 100B such as platform A and platform B illustrated in FIG. 1. For example, they may operate on different game systems such as predecessor and successor game systems that are distinguished by their hardware and/or software (e.g., an operating system). However, the different platforms may also be distinguished by a set of rights, such as license rights, that a user of the digital content assemblage or the user of a platform is willing to accept or reject.

As illustrated in FIG. 1, when the digital content assemblage 102 is operated on a first platform 100A such as platform A, the operation will permit the users to experience the included digital asset components 104A and 104B. In such a case, the operation of the components is permitted or compatible with the platform A. However, certain of the digital asset components of the assemblage may not be operated on a different platform. For example, when operating a digital content assemblage such the example video game on a second platform 100B (shown as platform B), one or more of the digital asset components can be prohibited from operating. In such a case, the prohibited component may be replaced or substituted for other digital asset components that are permitted for the platform B. The substitution digital asset component 106 may replace digital asset component 104B in such a manner to permit the user of the video game to have a substantially equivalent experience with the video game as if it was operating on platform A but instead with a permitted substitute digital asset component.

Figure 2:
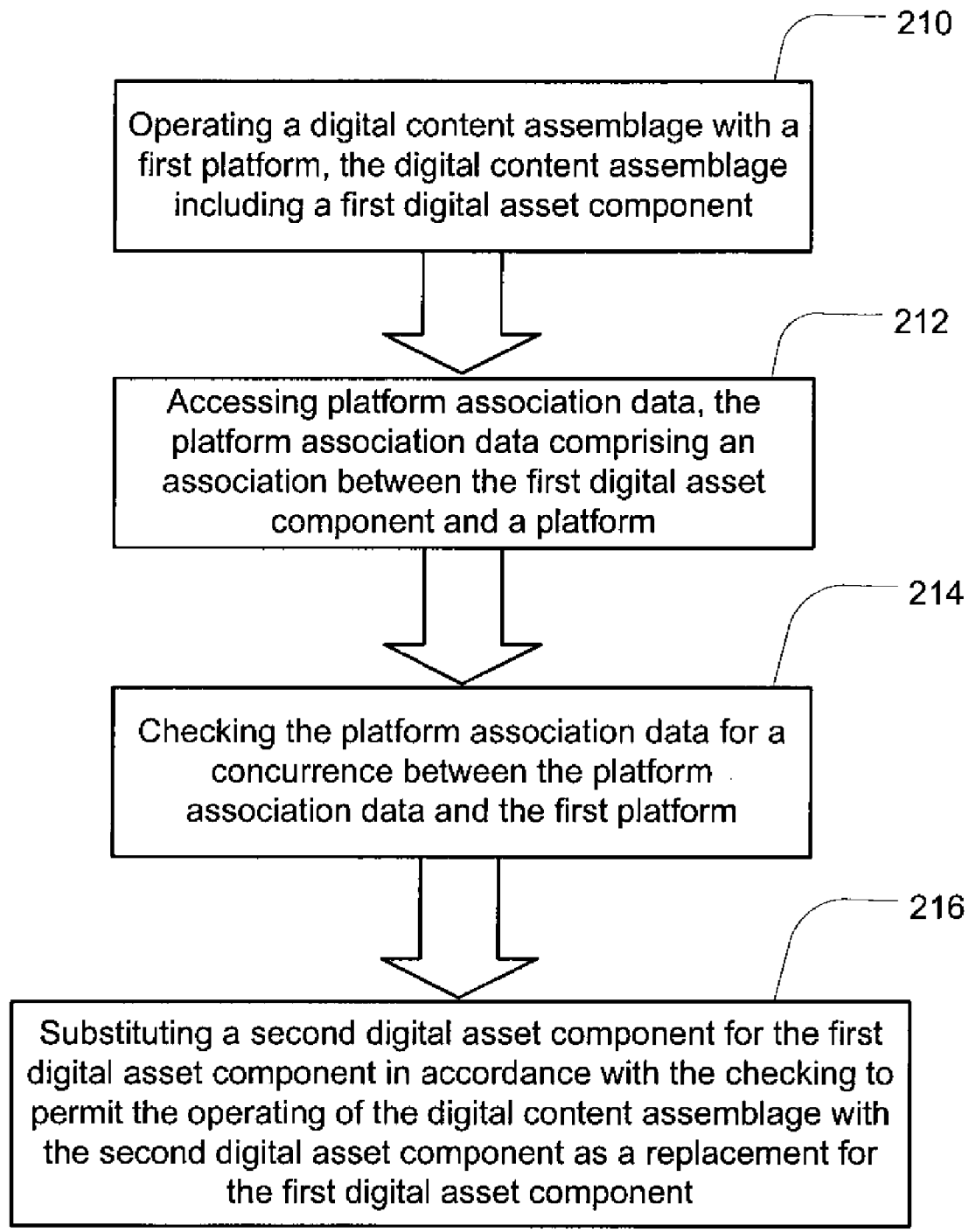
FIG. 2 is a flow chart illustrating steps in an algorithm of an embodiment the platform dependent replacement technology.

Steps in an example methodology for implementing such a system of platform based asset replacement are illustrated in FIG. 2. At 210, the digital content assemblage with a first digital asset component is operated with a first platform. In 212, platform association data may be accessed. The platform association data can provide an association between the one or more digital asset components, such as the first digital asset component and one or more platforms such as a second platform. For example, the platform association data may represent information to specify that operation of the first digital asset component is possible or acceptable with the second platform or only with the second platform. By way of further example, the platform association data may alternatively or in addition therefore, represent information to specify that the first digital asset component may not be operated with a particular platform. Such data may be implemented as platform association metadata. For example, the data may be implemented with name value pairs and/or with a look-up table or other suitable data structure. Optionally, digital asset component(s) themselves may be tagged with approved and/or disapproved platform identification data.

At 214, the platform association data is checked for a concurrence between the first platform and one or more digital asset component of the digital content assemblage, such as the first digital asset component. For example, a search of the metadata or lookup table may assess whether included platform data matches platform data for the system on which the digital content assemblage is or will operate. Thus, in some embodiments, data retrieved from and about the system may be compared to data of the platform association data for one or more of the digital asset components. For example, a platform identification and/or other platform description of the system such as license rights on which the digital content assemblage is operating may be retrieved from or with the system. That input, retrieved or detected system data may be compared to the lookup table, tag or metadata of the platform association data. This checking implements a detection of compatibility or permission to operate or utilize particular digital asset components with the digital content assemblage with the current platform of the system. If there is a concurrence with respect to some or all of the digital asset components, those digital asset components can and will be utilized in the operation of the digital content assemblage.

At 216, for some or all of the digital asset components that do not have a concurrence with respect to the platform association data, a substitution may be performed. Thus, a second or substitute digital asset component may be utilized instead of a first digital asset component that lacks correspondence with its platform association data based on the checking at 214. Thus, the second digital asset component serves as a replacement for the first digital asset component in accordance with the checking at 214.

As previously mentioned, the substitute digital asset component can be provided so as to maintain a substantially equivalent experience of the digital content assemblage. For example, a characterization of the first digital asset component may be comparable or have a correspondence with a characterization with the substitute digital asset component. Thus, the digital asset components may optionally be characterized by type or characterization metadata. For example, in the case of a substitution of a musical work for another musical work, these works may be characterized by a genre, instrument types, vocals, etc. Similarly, other works (e.g., video, graphic etc.) may also have suitable characterization data. Thus, a substitution digital asset component may optionally be automatically chosen for substitution by comparing characterization data describing the first digital asset component with characterization data for a group of potential substitute digital asset components. Alternatively, a substitution digital asset component may have a predetermined replacement relationship with the first digital asset component such that it may be replaced without an automatic decision process that evaluates characterization data for some characterization concurrence.

In these ways, the substitution assets may be selected to reflect the experience of the original media. However, in other embodiments, substitution assets may be selected in a manner to provide a modified experience when compared to the experience of an original digital content assemblage. Thus, a different type of substitution digital asset component may be selected in relation to the digital asset component being replaced. For example, a different music file may be selected of a different music genre. This may be accomplished automatically by, for example, determining a lack of correspondence between characterization data of the original digital asset component and the substitution digital asset component.

A system to implement each of these exemplary steps of the technology may typically be a general or specific purpose computer, video game console, hand-held game device, mobile phone or other device that may include one or more programmable processors with circuits and/or memory so as to permit an execution of certain processor control instructions embodying the functions or steps the methodology. The processor may comprise any number of well known processors, such as processors from Intel Corporation. Alternatively, the processor may be a dedicated controller such as an ASIC.

Thus, the system will include data and processor control instructions for memory and one or more processors or other integrated circuits that execute the functions, methods, algorithms and/or routines with respect to the digital content assemblage or video game in accordance with features explained herein. In some embodiments, these processor control instructions may comprise any set of instructions to be executed directly (such as machine code) or indirectly (such as scripts) by the processor. In that regard, the terms "instructions," "steps", "algorithm" and "programs" may be used interchangeably herein. The instructions may be stored in object code for direct processing by a processor, or in any other computer language including scripts or collections of independent source code modules that are interpreted on demand or compiled in advance.

Such a system will also typically include input and output components such as a user interface and/or display for playing a video game. For example, a keyboard, mouse, joystick, haptic response devices/motors, motion sensors and/or buttons may be included. The system or apparatus may also optionally include a communications device such as a wireless or wired interface for data transfer with other devices, computers or a network. For example, it may include a wireless or wired network card, WIFI communications device, Bluetooth communications device, etc. Additionally, a display screen such as an LCD, LEDs, touch screen, etc. can also be provided to permit user observation of particular visual features of the digital content assemblage. Speakers may also be provided to permit a user to listen to sound features of the digital content assemblage.

Figure 3:
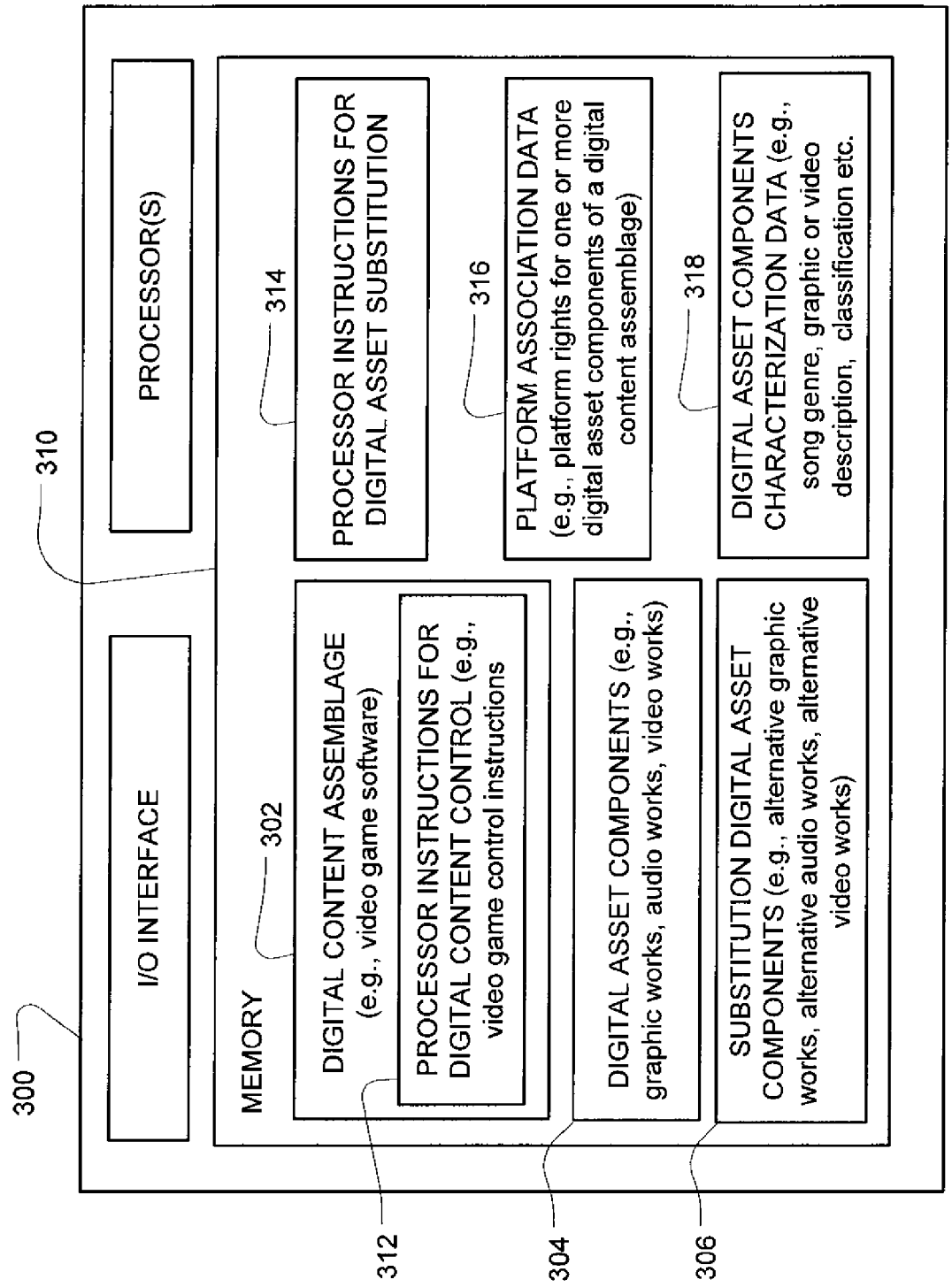
FIG. 3 shows example components for a special purpose computer or video game system for implementing an embodiment of the platform dependent replacement of digital content asset component technology.

An example embodiment with some components of a platform based digital asset replacement system 300 is further illustrated in the block diagram of FIG. 3. In this example, the instructions and data of the memory 310, such as a RAM, a secondary storage device (e.g. hard drive), an optical disk and reader/writer, memory cards, magnetic mediums, SIM cards, flash memory or other memory medium etc., set the operation of the processor(s) of the system. Thus, a memory medium accessible by the processor(s) and the I/O interface may include a digital content assemblage 302 such as a software package or video game software. Typically, this will include processor control instructions for digital content control 312 to execute the entertainment program or game play methodologies of the content or video game such as instructions for accessing and playing or displaying one or more of the included digital asset components. To this end, the memory will also typically include one or more of the digital asset components 304 as well as substitution digital asset components 306 as previously discussed. Furthermore, the system will also include processor control instructions for digital asset substitution 314 to accomplish the replacement methodologies previously discussed. These instructions may also be accompanied by the platform association data 316 and digital asset components characterization data 318 in accordance the embodiments of the prior discussion.

Figure 4:
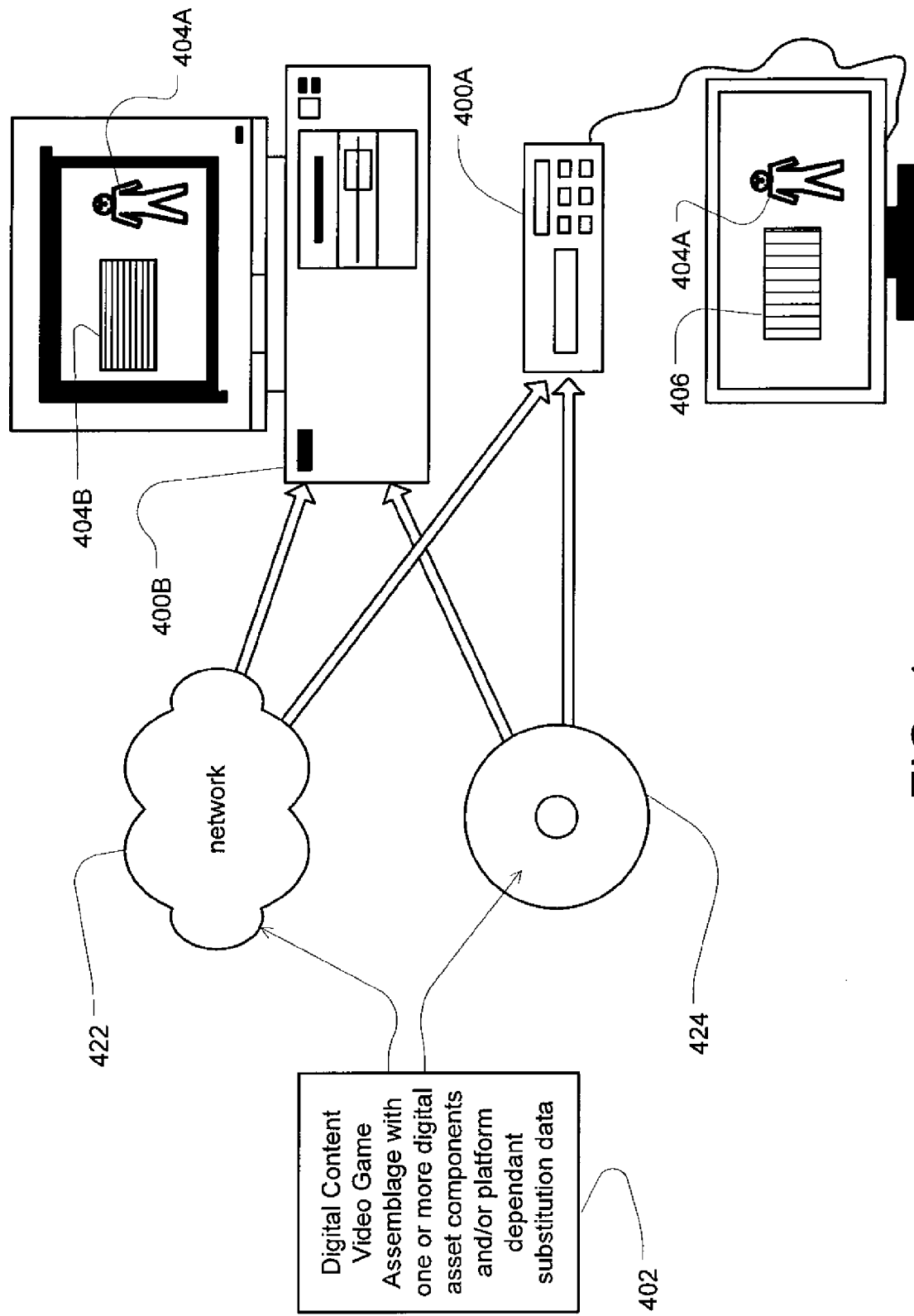
FIG. 4 is a diagram illustrating various systems for distribution of the platform dependent replacement of digital content asset component technology.

Such a configuration permits a more dynamic distribution and operation of digital content packages. As illustrated in FIG. 4, the digital content assemblage 402 may optionally be distributed separately from the substitution control instruction logic and substitution asset components, which may be distributed at a different time frame. For example, a video game may be distributed with digital asset components such as music files with a license to play the music files with one platform, such as a first version of a gaming system 400B. As future gaming systems are developed, the future or subsequent gaming system 400A may be designed to emulate the first gaming system so that the video game may also be operated on the new gaming system by emulating the first gaming system with either a hardware or software emulator. However, where the license right of one or more music file, voice file, or other asset, etc. is limited to the first gaming system or not compatible with the new gaming system such as if, for example, the publisher or designer of the original game only has license rights to distribute the assets with the game for the first platform, the substitution features may be subsequently distributed for operation with the original video game as previously discussed to then permit the video game to operate with the new gaming system. In such a situation, for example, the publisher or designer can avoid violating the license rights relating to one or more of the assets of the original video game given the limit of the original license rights to their use with only the original platform. In this manner, the incompatible or prohibited music files 404B may be prevented from operation with the new platform 400A through substitution. Thus, the permission or license rights to operate for the original music files 404B or other asset would not need to be renewed or extended for operation of the video game on the new gaming system 400A or different platform even when the original music files are capable of operation on the new gaming system. Rather, the replacement or substitute music files 406 may be operated in place of the original music files (e.g., swapped in) when the video game is operated on the subsequent gaming system with visual components 404A of the original video game because the replacement digital asset component(s) 406 would be compatible or permitted for operation with the new gaming system. While such a separate distribution capability exists with the technology and may be particularly useful for new generation system development, in some embodiments, the substitution features may be bundled with the digital content assemblage when originally distributed so as to permit selective platform operation with substitute digital asset components for some of the platforms that may already be available to operate a particular digital content assemblage.

Figure 5:
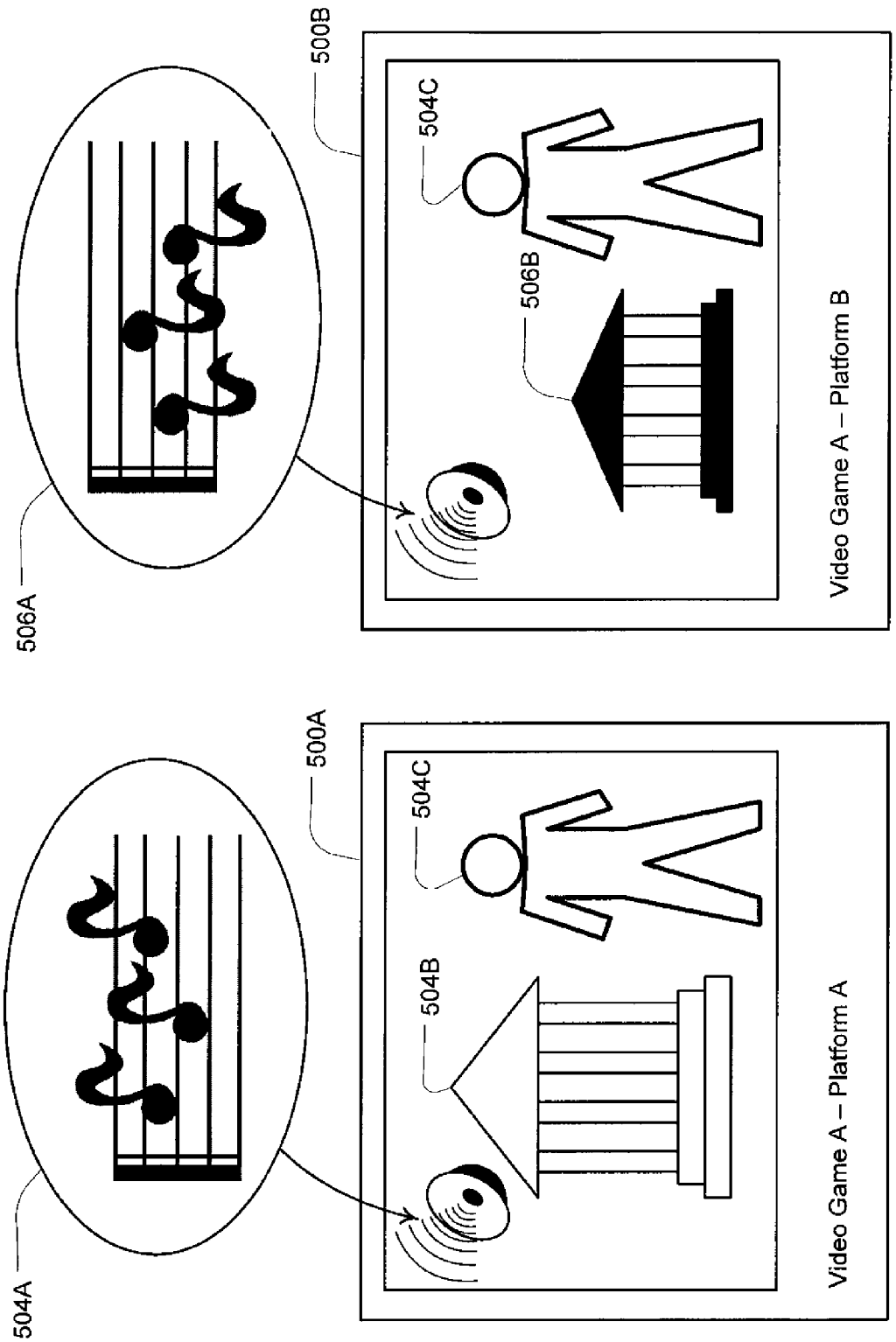
FIG. 5 shows example platform based replacements that may be implemented with some embodiments of the present technology.

FIG. 5 shows several example substitutions that may be implemented in the present technology with different platforms in a video game embodiment. In the video game 500A, a music file 504 is triggered to play at a certain time of game play as part of the entertainment experience of the game play. This may, for example, coincide with an avatar graphic 504C approaching or entering a level of play that includes a graphic work 504B. This operation of the video game would typically occur on each apparatus of a common platform. However, when the video game 500B is operated on a different or subsequent platform that lacks the rights or is inconsistent with rights of the first platform, a different substitute music work 506A or music file and/or substitute graphic work 506B is played in place of the original music work and/or original graphic work. That is, at the same or similar points of play of the original works, the substitute works would be operated so the play or entertainment experience for the user can be maintained with the different platform.

In the foregoing description and in the accompanying drawings, specific terminology and drawing symbols are set forth to provide a thorough understanding of the present technology. In some instances, the terminology and symbols may imply specific details that are not required to practice the technology. For example, although the terms "first" and "second" have been used herein, unless otherwise specified, the language is not intended to provide any specified order or count but merely to assist in explaining elements of the technology.

Moreover, although the technology herein has been described with reference to particular embodiments, it is to be understood that these embodiments are merely illustrative of the principles and applications of the technology. It is therefore to be understood that numerous modifications may be made to the illustrative embodiments and that other arrangements may be devised without departing from the spirit and scope of the technology.

The invention claimed is:

1. A method of operating a digital content assemblage with a digital processor for controlling platform dependent replacement of digital asset components, the method comprising:
   operating a digital content assemblage with a platform, wherein the digital content assemblage comprises a number of digital asset components, the digital asset components including a first and a second digital asset component;
   accessing platform association data, the platform association data comprising an association between the first digital asset component and a second platform, wherein the platform association data characterizes whether the first digital asset component may operate on the second platform;
   dynamically checking with the digital processor the platform association data for a concurrence of compatibility between the platform association data and the platform for operating the first digital asset component; and
   substituting amongst an aggregation of the number of digital asset components the second digital asset component for the first digital asset component in accordance with the checking to permit the second digital asset component to operate as a replacement for the first digital asset component.

2. The method of claim 1 wherein the number of digital asset components comprises digital entertainment software.

3. The method of claim 2 wherein the digital entertainment software comprises a video game.

4. The method of claim 3 wherein the first digital asset component comprises a digital audio work.

5. The method of claim 3 wherein first digital asset component comprises a digital graphic work.

6. The method of claim 1 wherein operating the digital content assemblage with the platform comprises an emulation of a second platform.

7. The method of claim 1 wherein the substituting comprises utilization of the second digital asset component upon confirmation that first characterization data associated with the first digital asset component and second characterization data associated with the second digital asset component correspond.

8. A non-transitory, tangible digital storage medium having stored digital processor control instructions, the digital processor control instructions comprising a method of operating a digital content assemblage with a digital processor for controlling platform dependent replacement of digital asset components, the medium comprising:
   processor control instructions to operate the digital content assemblage with a platform, wherein the digital content assemblage comprises a number of digital asset components, the digital asset components including a first and a second digital asset component;
   processor control instructions to access platform association data, the first platform association data comprising an association between the first digital asset component and a platform, wherein the platform association data characterizes whether the first digital asset component may operate on the second platform;
   processor control instructions to dynamically check with the digital processor the platform association data for a concurrence of compatibility between the platform association data and the platform for operating the first digital asset component; and
   processor control instructions to substitute amongst an aggregation of the number of digital asset components the second digital asset component for the first digital asset component in accordance with the checking to permit the second digital asset component to operate as a replacement for the first digital asset component.

9. The digital storage medium of claim 8 wherein the number of digital asset components comprises digital entertainment software.

10. The digital storage medium of claim 9 wherein the digital entertainment software comprises a video game.

11. The digital storage medium of claim 10 wherein the first digital asset component comprises a digital audio work.

12. The digital storage medium of claim 10 wherein first digital asset component comprises a digital graphic work.

13. The digital storage medium of claim 8 wherein the instructions to operate the digital content assemblage with the platform comprises an emulation of a second platform.

14. The digital storage medium of claim 8 wherein the instructions to substitute comprise utilization of the second digital asset component upon confirmation that first characterization data associated with the first digital asset component and second characterization data associated with the second digital asset component correspond.

15. A system for controlling a digital content assemblage with platform dependent replacement of digital asset components, wherein the digital content assemblage comprises a number of digital asset components for operation with a platform, the digital asset components including a first and second digital content asset, the system comprising:
   platform association data, the platform association data comprising an association between the first digital asset component and a second platform, wherein the platform association data characterizes whether the first digital asset component may operate on the second platform; and
   a second digital asset component for substitution of the first digital asset component in accordance with a check with a digital processor for compatibility of the platform association data with a second platform to permit operation of the digital content assemblage with the second digital asset component as a replacement for the first digital asset component when operating the digital content assemblage with the second platform.

16. The system of claim 15 wherein the number of digital asset components comprises digital entertainment software.

17. The system of claim 16 wherein the digital entertainment software comprises a video game.

18. The system of claim 15 wherein the digital content assemblage comprises a video game.

19. The system of claim 18 wherein the first digital asset component comprises a digital audio work.

20. The system of claim 18 wherein first digital asset component comprises a digital graphic work.

21. The system of claim 18 further comprising an emulator to operate the digital content assemblage with the platform as an emulation of a second platform.

22. The system of claim 18 further comprising first characterization data associated with the first digital asset component and second characterization data associated with the second digital asset component, wherein a correspondence between information of the first characterization data and information of the second characterization data permits the substitution of the second digital asset component for the first digital asset component.

* * * * *